United States Patent Office 3,445,862
Patented May 27, 1969

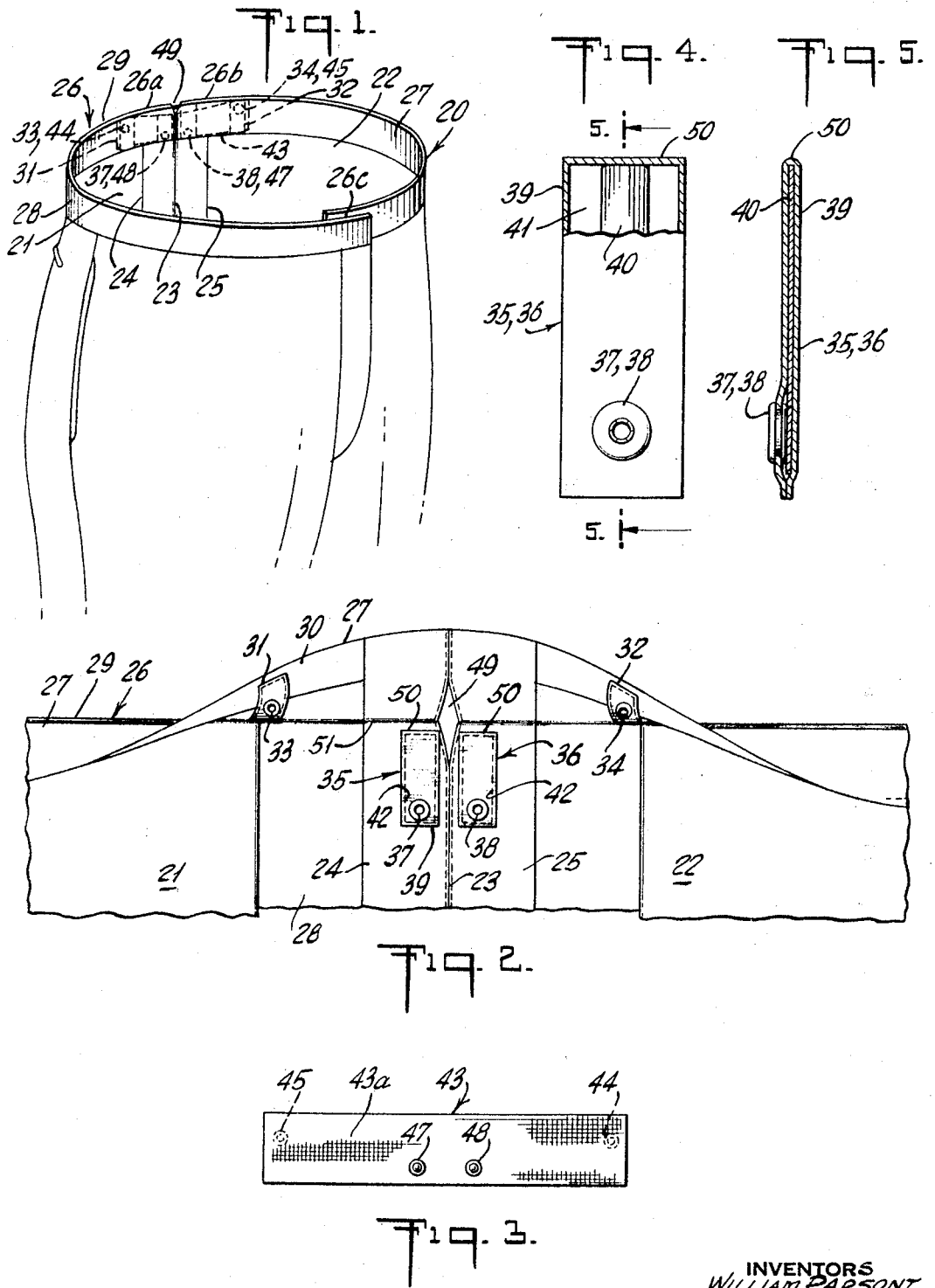

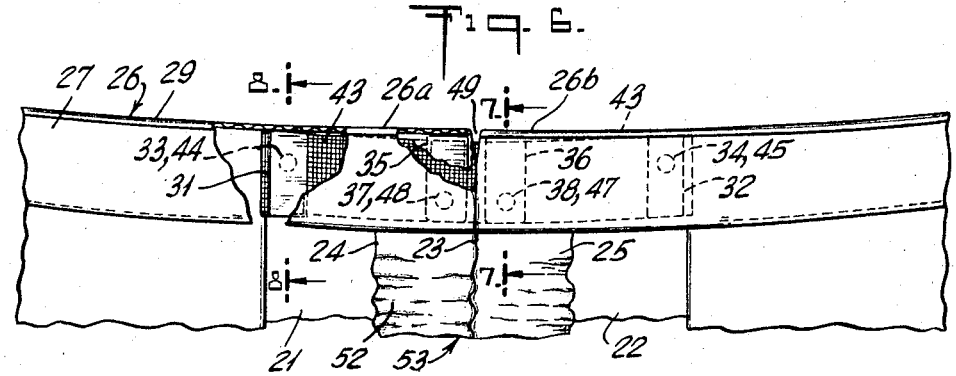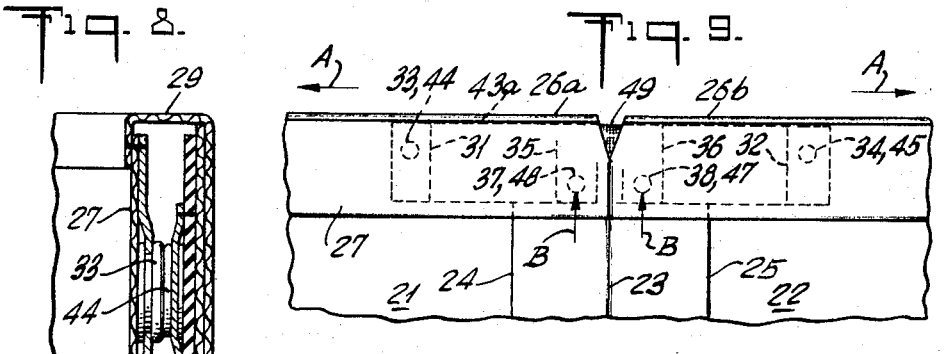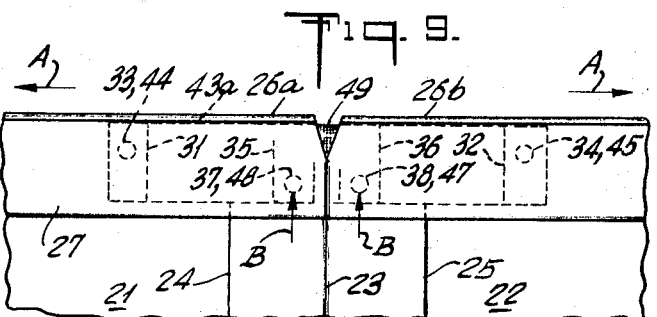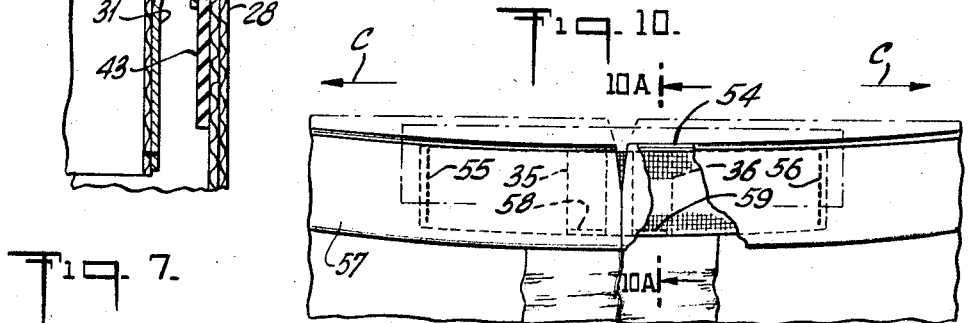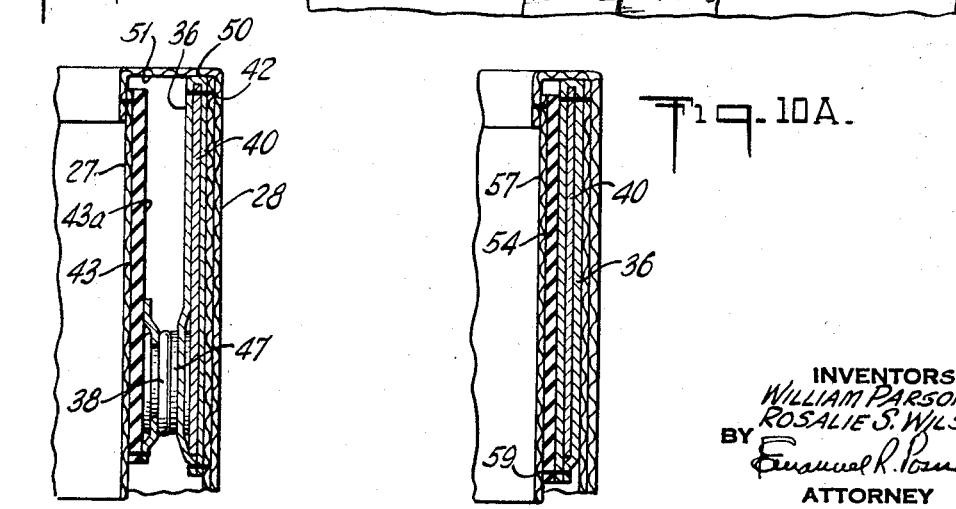

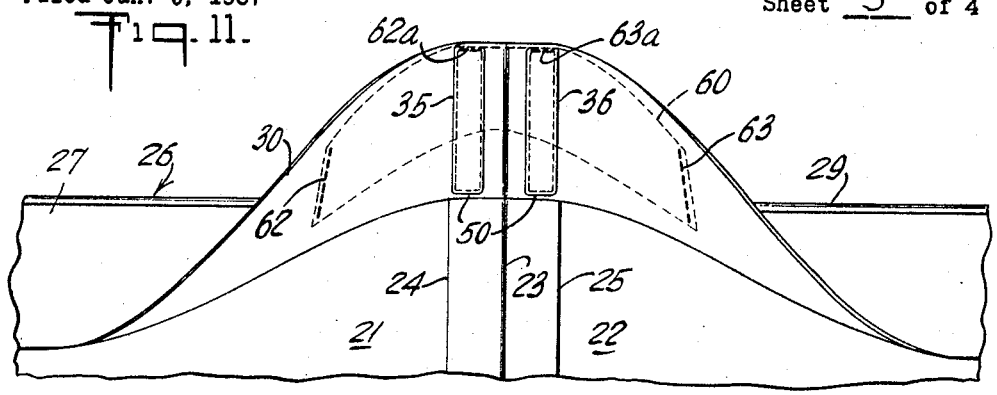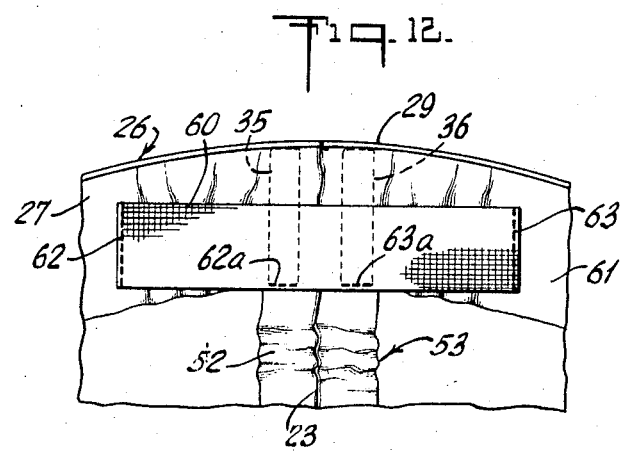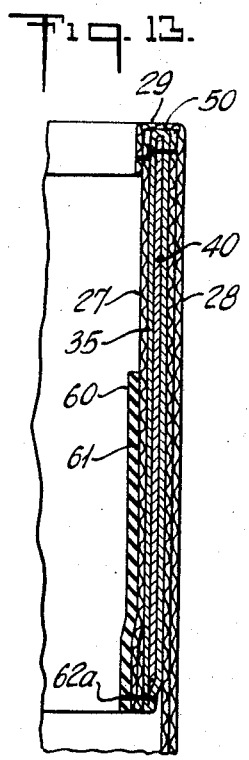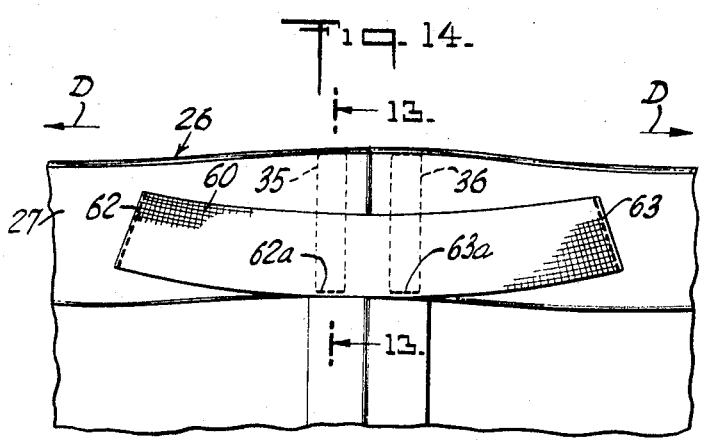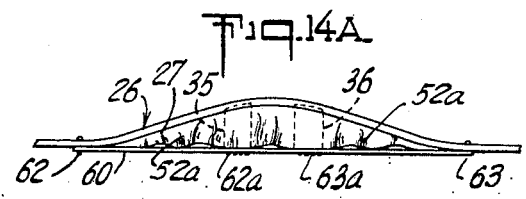

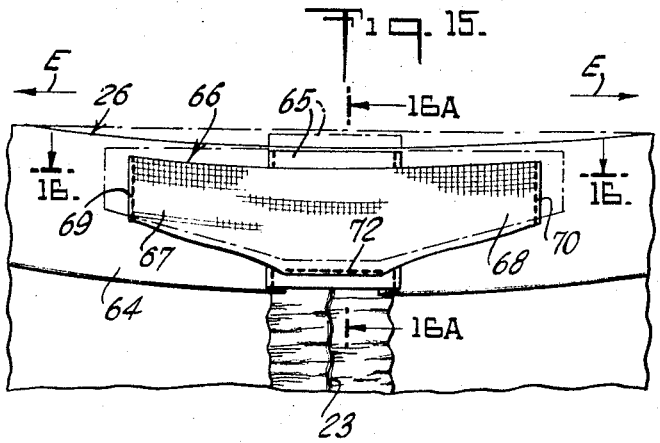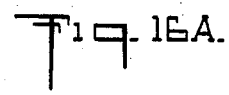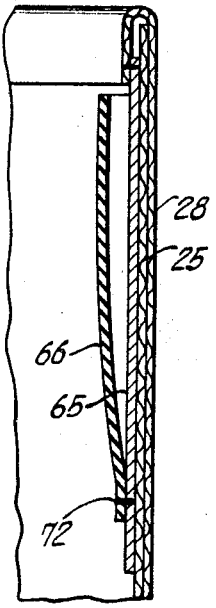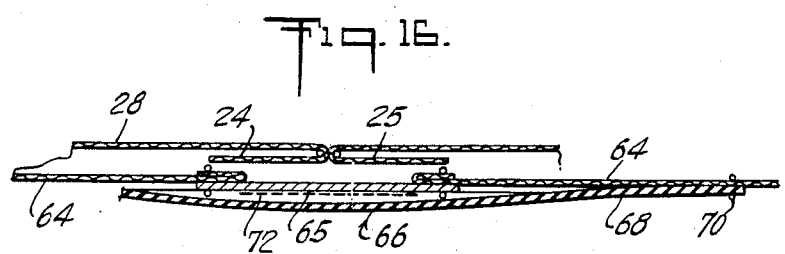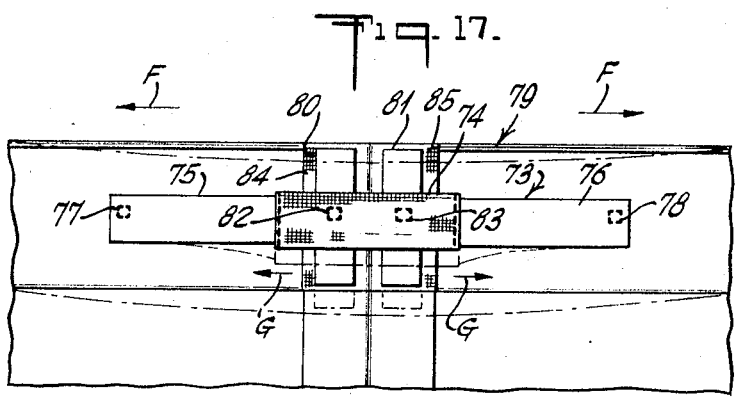

3,445,862
TROUSER ADJUSTERS
William Parsont and Rosalie S. Wilson, Forest Hills, N.Y., assignors of one-tenth to Michael J. Parsont, Forest Hills, N.Y.
Continuation-in-part of application Ser. No. 422,111, Dec. 30, 1964. This application Jan. 5, 1967, Ser. No. 607,498
Int. Cl. A41d 27/00
U.S. Cl. 2—237    18 Claims

ABSTRACT OF THE DISCLOSURE

A trouser adjuster for reducing or eliminating sagging at the rear portion of the garment. An elastic lifting member is attached to the inside rear portion of the waistband for effecting a lifting of the seat of the trousers upon an operative encirclement of the waistband portion about the body of the wearer.

BACKGROUND OF THE INVENTION

The field of the invention

This invention relates to trouser adjusters for reducing or eliminating sagging at the rear of the garment, this application being a continuation-in-part of the application filed Dec. 30, 1964, Ser. No. 422,111 now U.S. Patent No. 3,307,203 dated Mar. 7, 1967.

The prior art

The invention of said prior application employs an elastic member at the rear inner portion of the trousers to produce a lifting of the seat and crotch sections whereby loose portions in said regions are eliminated—a correction that conventionally is effected either by tailoring steps or by the use of unsightly suspenders. The said elastic lifting member has laterally opposite portions attached to waistband portions at opposite sides of the medial seam, the lower portion of the lifting member being adapted for securement to fastening means attached to the trouser seat at points below the waistline. The arrangement is such that upon a yieldable pulling down of the elastic member to the lower fastening means, a strain will be induced within said member, so that upon the upward return of said member due to its elasticity the seat portion of the trousers will be correspondingly lifted upwardly.

While said construction of the prior application is effective in accomplishing its intended function, the lifting action is accomplished essentially by the preliminary steps of pulling the lifting member down and anchoring the lower portion of the member to the fastening means below the waistband, thereby at times requiring the performance of operations by the wearer. Moreover, a portion of the lifting member extends below the waistband portion, said portion, together with said lower fastening means, being engageable with the body of the wearer below the waist.

The present invention, while employing an elastic lifting member attached to the waistband portion, need not extend therebelow; nor need it rely on the yieldable pulling down of said member for attachment to lower fastening means for the desired lift. Instead, the structure of this invention is such as to enable the ordinary encirclement of the waistband portion about the body of the wearer to effect a horizontal stretching of the elastic member to pull up the rear waistband portion and correspondingly lift the seat portion upwardly, as will more clearly hereinafter appear.

SUMMARY OF THE INVENTION

In the preferred embodiments of the present invention the elastic lifting member, which may be substantially like the lifting member of said prior application, has its laterally opposite ends—referred to herein as "anchoring sections"—secured to the rear interior portion of the waistband portion of the trousers, and also has a central portion—referred to herein as an "intermediate section"—between said anchoring sections. In normal inoperative position the said elastic member is under no horizontal pull, and may even sag somewhat between the lateral anchoring points. But when the waistband portion is operatively tightened upon being brought into embracing engagement with the wearer's waist, the resulting opposite horizontal pulls applied to the elastic member will cause it to stretch and tend to straighten itself until it is brought to a predetermined final holding position, at which level said intermediate section yieldably supports and maintains the attached waistband portion, thereby holding the lifted rear trouser portion at a raised level. In the preferred construction the attached intermediate section is below the level of the anchoring sections. It is also preferred, for most effective results, that stiffening means be employed in engagement with the rear waistband portion, the said intermediate section being attached to said stiffening means, so that any upward movement of said stiffening means will cause a corresponding upward movement of said waistband portion and the parts carried thereby. The terms "elastic member" and "elastic lifting member" as used herein are intended to denote lifting members that are either entirely elastic or that have elastic portions therein.

This invention is thus effective in eliminating trouser sagging by a simpler, less expensive and more compact construction than that of said prior application, yet retaining most of its advantages.

Another advantage of the present invention is that the horizontal strained lifting member helps to yieldably maintain the waistband in position about the wearer, thereby eliminating the need for a belt.

A further advantage is that this construction does not interfere with any altering operations that may be deemed necessary in letting out or taking in the rear of the trousers at the seams, inasmuch as neither the lifting member nor the stiffening members are positioned in interfering relation to said seams.

Other objects, features and advantages will appear from the drawings and the description hereinafter given.

DESCRIPTION OF THE DRAWINGS

FIG. 1 is a fragmentary perspective view of a pair of trousers provided with one form of this invention.

FIG. 2 is an enlarged fragmentary elevation of the rear portion of the garment of FIG. 1, looking from the inside, the inner waistband being shown raised to reveal certain components of this form of our invention.

FIG. 3 is a rear elevational view of the elastic lifting member adapted for operative use with the structure of FIG. 2.

FIG. 4 is an elevational view of one of the encased stiffening members employed in this form of our invention, a portion of the envelope being removed for clarity.

FIG. 5 is a section of FIG. 4 taken along line 5—5.

FIG. 6 is a fragmentary elevational view like FIG. 2, but with the components of FIGS. 3 and 4 in place, and with the waistband in its operative position, the elastic lifting member being shown prior to the operative lateral stretching thereof, a portion of the inner waistband being removed for clarity.

FIG. 7 is an enlarged fragmentary section of FIG. 6 taken along line 7—7.

FIG. 8 is an enlarged fragmentary section of FIG. 6 taken along line 8—8.

FIG. 9 is a view substantially like FIG. 6, but showing the elastic lifting member in an operatively strained condition with the rear portion of the trousers raised to a position above that shown in FIG. 6.

FIG. 10 is a fragmentary rear view of a modified form of this invention, looking from the inside, a portion of the inner waistband being removed for clarity, the elastic lifting member and waistband portion being shown in full lines in relaxed condition, and in dot-dash lines in their operatively raised positions.

FIG. 10A is a fragmentary section of FIG. 10 along line 10A—10A.

FIG. 11 is an enlarged fragmentary elevation, looking from the inside, of another modification of this invention, the inner waistband being shown raised to reveal certain of the components in operative position.

FIG. 12 is a view like FIG. 11, but showing the inner waistband in operative position and the elastic lifting member and stiffening members operatively in place, the parts being shown in their relaxed positions.

FIG. 13 is an enlarged section of FIG. 14 taken along line 13—13.

FIG. 14 is a view like FIG. 12, but showing the parts in their operatively raised positions.

FIG. 14A is a top view of FIG. 12.

FIG. 15 is a fragmentary rear view, looking from the inside, of still another modification of this invention, the full lines showing the parts in their relaxed positions, the dot-dash lines showing them in their operatively raised positions.

FIG. 16 is an enlarged section of FIG. 15 taken along line 16—16.

FIG. 16A is a section of FIG. 15 along line 16A—16A.

FIG. 17 is a fragmentary rear view, looking from the inside, of another modified form of this invention, the dot-dash lines showing the construction in its relaxed position, the full lines showing it in its operative lifted position.

DESCRIPTION OF PREFERRED EMBODIMENTS

In the form of our invention illustrated in FIGS. 1 to 9, the trousers 20 contain the conventional rear panels 21 and 22 sewed together at the rear seam 23 to form the conventional "outlet," the excess marginal material at said seam forming the two wings 24 and 25. In the construction illustrated, the peripheral waistband portion, generally designated by the reference number 26, comprises the inner waistband 27 and the double-walled outer waistband 28, a part of the latter being folded over at the top to form the top edge 29 of the waistband portion (See FIGS. 7 and 8).

As will be noted from FIG. 2, the inner surface 30 of said inner waistband 27 has, at laterally opposite portions thereof, two anchoring tapes 31 and 32 supporting the female snap fasteners 33 and 34, respectively. Attached to the inner wall of the outer waistband portion 28, in proximate flanking relation to said seam 23, are the two stiffening members 35 and 36, these operatively supporting the female snap fasteners 37 and 38, respectively. In this embodiment the said snap fasteners 33 and 34—the anchoring snap fasteners—are at a level above that of the said two snap fasteners 37 and 38.

In the form illustrated, the stiffening means 35 and 36 are stay members, each comprising a casing or envelope 39 of pliable material, such as fabric, and a flexible inner stay element 40, the peripheral margin 41 of the envelope 39 which surrounds the edges of stay 40 being sufficiently wide to permit a peripheral line of stitching for securing the envelope to the waistband portion, such stitching being indicated by the reference numeral 42 in FIG. 2. The snap fasteners 37 and 38 are secured to the outer surface of the envelope in any manner known to those skilled in the art.

The lifting member of this form of our invention comprises an elastic elongated strip 43 stretchable in both horizontal and vertical directions. Affixed to the upper laterally opposite sections of member 43—said sections being herein termed "anchoring sections"—are the male snap fasteners 44 and 45 adapted for coactive engagement with said snap fasteners 33 and 34, respectively; and affixed at the lower medial region of said member 43—said medial region being hereinafter referred to as "intermediate section"—are the two male snap fasteners 47 and 48 adapted for coactive engagement with the said snap fasteners 38 and 37, respectively.

The said lifting member 43 is operatively applied to the waistband by bringing the surface 43a thereof in facing relation to the surface 30 of said inner waistband 27, the length of said member 43 being such that when the waistband 27 is in the position shown in FIG. 6 the said member 43 will be extended substantially along its entire length. The manner in which the inner waistband 27 is sewn or otherwise secured into place is not herein described, as such securement may be performed by any means known to those skilled in the art. It should be noted that the illustrated waistband construction has its laterally opposite sections 26a, 26b separated by the slit portion 49, thereby to permit relative lateral opposite movements of said sections.

Each of said stiffening members 35 and 36 is shown as being so positioned that the top edge 50 thereof extends up to and engages the underside 51 of said fold-over part 29 of the waistband portion. However, this particular arrangement is not required, especially where the stiffening members are directly attached to the waistband portion. The basic arrangement is hence similar to that of said prior application in that any upward movement of said stiffening members will cause a corresponding upward movement of the adjacent sections of the waistband portion and a lifting of the trouser seat.

As will be seen from FIG. 6, when the waistband portion 26 and lifting member 43 are in their substantially relaxed positions illustrated, there are folds 52 in the seat portion 53 of the trousers. When the waistband is operatively lifted, the seat portion 53 is correspondingly raised, thereby eliminating said folds 52.

This lifting action of said stiffening members 35 and 36 is effected, in this form of our invention, merely by operatively closing the front waistline portion 26c so as to effect a snug encirclement of the waistband 26 about the waist of the wearer. This produces opposite pulls in the direction of arrows A (FIG. 9), causing a slight separation of the two sections 26a and 26b of the waistband and a streching and straightening out of the lifting member 43 from its relatively relaxed position of FIG. 6 to the taut position of FIG. 9. As will be seen from the latter figure, such a stretching of member 43 causes the upper edge 43a thereof to assume the form of a straight line, thereby carrying up with it the lower portion of the lifting member 43, whereby the snap fasteners 37, 48 and 38, 47 are correspondingly raised. Since the snap fasteners are also attached to the stiffening members 35 and 36, such stiffening members will be correspondingly lifted in the direction of arrows B, thereby lifting the rear of waistband portion 26 and the seat portion 53. This results in the desired elimination of sagging and of the unsightly folds 52, at the same time producing a closer and more comfortable fit.

The above described construction thus enables the desired lifting effect to be obtained merely by the opposite pulling forces applied to the lifting member 43 upon the operative embracing engagement of the waistband portion 26 with the body of the wearer. There is thus no need to pull the lifting member from an upper position to a lower cooperative position to create the lifting strain in the elastic member 43, as is required with the construction described in the said prior application. It is understood, however, that in the contemplation of this invention, the positions of the snap fasteners 37 and 38 may be sufficiently low as to create a vertically directed strain within the elastic member 43, whereby the lifting action of said member may be due both to the vertical and horizontal contracting tendencies thereof.

In the form of our invention illustrated in FIGS. 10 and 10A, snap fasteners are entirely eliminated. In this embodiment, the elastic lifting member 54 is attached by stitching 55 and 56 to the inner surface of the inner waistband 57. Similarly, the lower portions of the elastic lifting member 54 are secured by stitching 58 and 59 to the lower marginal portions of the respective stiffening members 35 and 36—said stiffening members being otherwise positioned at the waistband portion substantially as in the form first above described. The full-line positions of FIG. 10 show the elastic member 54 and the adjacent portion of the waistband in relaxed position, said member 54 and the associated parts being shown in a somewhat sagging position, similar to that shown in FIG. 6. When opposite pulls are exerted in the direction of arrows C, in the manner aforesaid, the elastic member 54 will be stretched to the position shown by dot-dash lines, thereby lifting the waistband portion upwardly to the dot-dash position, just as with the structure illustrated in FIGS. 1 to 9.

In FIGS. 11 to 14A, the stiffening members 35 and 36 are operatively sewn to the inner surface 30 of the inner waistband 27, in flanking relation to the seam 23, as clearly shown in FIG. 11. The edges 50 of said stiffening members are positioned in the region of the top edge 29 of the waistband 26. The elastic lifting member 60, substantially like lifting members 43 and 54 above described, is now attached to the front surface 61 of the inner waistband 27 (rather than at the rear or hidden surface thereof) as indicated in FIG. 12. The said elastic member 60 is secured to the inner waistband 27 by stitching 62 and 63, and to the bottom portions of the stays 35 and 36 by stitching 62a and 63a. The stays are of such a length that they maintain the top edge 29 of the waistband 26 upwardly in a convex configuration, as shown in FIG. 12. The regions of attachment of the lifting member 60 to the waistband at the said stitching lines 62 and 63 are so spaced that when the member 60 is fully extended in its unstrained position, as shown in FIG. 12, the inner waistband portion 27 between said stitching lines will be loose and somewhat gathered as indicated by the folds 52a, the stays 35 and 36 leaning out of the vertical plane. In other words, the horizontal length of waistband material between the stitching 62 and 63 is greater than the horizontal length of the material of said member 60 between said stitching lines. When lateral pulls are applied in the direction of arrows D, the elastic member 60 will be stretched to the position shown in FIG. 14, thereby extending the inner waistband portion to a taut condition and bring the stays into substantially vertical planes, whereby the entire waistband 26 and the portion therebelow at the rear of the trousers will be lifted, in the desired manner.

The embodiment of our invention shown in FIGS. 15 and 16 employs an inner waistband 64 that has at the central portion thereof a stiffened section 65 made of stiff buckram or other suitable material. The elastic lifting member 66 has its laterally opposite anchoring ends 67 and 68 of reduced vertical proportions, the vertical height of these sections being sufficient to accommodate stitching 69 and 70 securing said ends to the inner waistband 64. The bottom intermediate portion 61 of the elastic member 67 is secured by stitching 72 to the said stiffened portion 65 of the waistband portion 64.

In this embodiment of our invention, when lateral pulls are applied in the direction of arrows E in the manner aforesaid, the stretching of member 66 will cause a lifting thereof from its relaxed sagging position, whereby the stitching 72 will pull said stiffened portion 65 upwardly to effect the desired lifting of the rear portion of the trousers, in a simple and effective manner.

FIG. 17 shows a further simplified construction of our invention. In this embodiment the lifting member 73 comprises the intermediate elasticized portion 74 flanked by the lateral inelastic portions 75 and 76. The opposite anchoring sections of said latter portions are secured by stitching 77 and 78 to the waistband portion 79, and the said intermediate elasticized portion is attached to the stiffening members 80 and 81 by the stitching 82 and 83, respectively, said stiffening members being secured to the waistband. It will be noted that the stitching 77 and 78 of the said anchoring sections are not above the level of the stitching 82 and 83 of the intermediate section, said stitching being, in the particular embodiment illustrated, substantially at the same level.

Before the waistband 79 is operatively tightened about the wearer's waist, both the waistband 79 and the lifting member 73 are in relaxed condition and sagging somewhat, as indicated by the dot-dash lines in FIG. 17. When the waistband 79 is brought into operative embracing engagement with the wearer's body, the opposite pulling forces in the direction of arrows F will cause the elastic member 73 to be stretched in the direction of the arrows G to the full-line position shown in said figure, whereby said member will be straightened and said stitching 82 and 83 of said intermediate section brought to their final holding positions, thereby elevating said stiffening members 80 and 81 and lifting the waistband 79 and portions therebelow, substantially in the manner aforesaid. In the embodiment shown the waistband portion contains the two elatsic sections 84 and 85, thereby permitting relatively greater opposite movements of the waistband in the direction of arrow F and consequently a greater stretching and tensioning of member 73.

The tensioned member 73 will thus yieldably maintain said waistband portion and the trouser seat therebelow in said raised position as determined by said final holding position of the member's intermediate section. This is similar to the lifting and holding action of the other embodiments hereinabove described.

In the above description, the invention has been disclosed merely by way of example and in preferred manner; but obviously many variations and modifications may be made therein. It is to be understood, therefore, that the invention is not limited to any form or manner of practicing same.

We claim:

1. In a pair of trousers including a waistband portion adapted for embracing engagement with the body of the wearer, the combination of a trouser adjuster and said waistband portion, said adjuster comprising an elastic lifting member secured at laterally opposite anchoring sections thereof to the trousers at the rear interior portion of said waistband portion, whereby there can be no relative movement between said anchoring sections of said lifting member and the adjacent portions of said waistband portion, said lifting member also being attached at an intermediate section thereof to the trousers at an adjacent section of said waistband portion thereof below said anchoring sections, said waistband portion and said elastic lifting member including means permitting relative extension of said elastic lifting member, whereby when said waistband portion is operatively brought into embracing engagement with the body of the wearer said elastic lifting member will be yieldably extended horizontally and tensioned, thereby to raise said intermediate section upwardly whereby the rear trouser part attached to said intermediate section of said lifting member will be correspondingly raised.

2. In a pair of trousers the combination according to claim 1, said intermediate section of said lifting member being substantially at the medial portion thereof.

3. In a pair of trousers the combination according to claim 1, said elastic lifting member being disposed sub- 4. In a pair of trousers the combination according to claim 1, said waistband portion having an inner and an outer waistband, said elastic lifting member being disposed between said inner and outer waistbands.

5. In a pair of trousers the combination according to claim 1, said waistband portion having an inner and an outer waistband, said elastic lifting member being disposed on the front surface of said inner waistband.

6. In a pair of trousers the combination according to claim 1, said intermediate section of said elastic lifting member and the coactively attached part of said trousers having releasable cooperative fastening means at the region of attachment.

7. In a pair of trousers the combination according to claim 1, further provided with stiffening means in engagement with said waistband portion, said intermediate section of said elastic lifting member being attached to said stiffening means.

8. In a pair of trousers the combination according to claim 7, said lifting member being attached to the lower portion of said stiffening means.

9. In a pair of trousers the combination according to claim 7, said stiffening means extending substantially from the lower border of said waistband portion to the upper border thereof.

10. In a pair of trousers the combination according to claim 7, said stiffening means comprising a section of said waistband portion made of stiff material and positioned at the rear medial portion thereof.

11. In a pair of trousers the combination according to claim 7, said stiffening means comprising a stay member extending upwardly substantially between the top and bottom borders of said waistband portion.

12. In a pair of trousers the combination according to claim 11, said stay member being attached to said waistband portion.

13. In a pair of trousers the combination according to claim 12, said waistband portion having an inner and an outer waistband, said stay member being attached to the inner surface of said outer waistband.

14. In a pair of trousers the combination according to claim 12, said waistband portion having an inner and an outer waistband, said stay member being attached to said inner waistband.

15. In a pair of trousers the combination according to claim 14, the upper edge of said stay member being in engagement with the top portion of said waistband portion.

16. In a pair of trousers the combination according to claim 7, said stiffening means being a stay member comprising an envelope and a stay element disposed therein.

17. In a pair of trousers the combination according to claim 16, said envelope having a marginal border surrounding at least a portion of said stay element, said stay member being attached to said waistband portion at said marginal border.

18. In a pair of trousers, the combination according to claim 1, the length of waistband material between said anchoring sections being greater than the horizontal length of the unstressed lifting member material between said anchoring positions.

References Cited

UNITED STATES PATENTS

| | | | |
|---|---|---|---|
| 2,060,775 | 11/1936 | Barry | 2—237 |
| 2,233,136 | 2/1941 | Larson et al. | 2—237 |
| 2,434,217 | 1/1948 | Miller | 2—227 |

FOREIGN PATENTS

| | | |
|---|---|---|
| 337,476 | 2/1904 | France. |

H. HAMPTON HUNTER, *Primary Examiner.*

U.S. Cl. X.R.

2—231